United States Patent
Arbore (10) Patent No.: US 6,970,631 B2
(45) Date of Patent: Nov. 29, 2005

(54) SUPPRESSION OF CLADDING MODE LOSS IN FIBER AMPLIFIERS WITH DISTRIBUTED SUPPRESSION OF AMPLIFIED SPONTANEOUS EMISSION (ASE)

(75) Inventor: Mark A. Arbore, Los Altos, CA (US)

(73) Assignee: Lightwave Electronics, Mountain View, CA (US)

( * ) Notice: Subject to any disclaimer, the term of this patent is extended or adjusted under 35 U.S.C. 154(b) by 172 days.

(21) Appl. No.: 10/163,557

(22) Filed: Jun. 5, 2002

(65) Prior Publication Data

US 2003/0228118 A1 Dec. 11, 2003

(51) Int. Cl.⁷ .................................................. G02B 6/16
(52) U.S. Cl. ...................... 385/123; 385/144; 359/341.1
(58) Field of Search ........................................ 385/123

(56) References Cited

U.S. PATENT DOCUMENTS

| | | | |
|---|---|---|---|
| 4,515,436 A | 5/1985 | Howard et al. | |
| 4,764,933 A | 8/1988 | Kozlovsky et al. | |
| 5,056,888 A | 10/1991 | Messerly et al. | |
| 5,225,925 A | * 7/1993 | Grubb et al. ........... | 359/341.32 |
| 5,260,823 A | 11/1993 | Payne et al. | |
| 5,392,154 A | 2/1995 | Chang et al. | |
| 5,452,116 A | 9/1995 | Kirkby et al. | |
| 5,473,714 A | 12/1995 | Vengsarkar | |

(Continued)

OTHER PUBLICATIONS

L.G. Cohen et al., "Radiating Leaky–Mode Losses in Single–Mode Lightguides with Depressed–Index Claddings," IEEE Journal of Quantum Electronics, vol. QE–18, No. 10, Oct. 1982, pp. 1467–1472.

Ishikawa et al., "Novel 1500 nm–Band EDFA with Discrete Raman Amplifier," ECOC–2001, Post Deadline Paper.

Stolen et al, "Short W–Tunneling Fibre Polarizers," Electronics Letters, vol. 24, 1988, pp. 524–525.

Akira Tomita et al., "Mode Coupling Loss in Single–Mode Fibers with Depressed Inner Cladding", Journal of Lightwave Technology, vol. LT–1, No. 3, Sep. 1983, pp. 449–452.

*Primary Examiner*—John R. Lee
*Assistant Examiner*—Phillip A. Johnston
(74) *Attorney, Agent, or Firm*—Lumen Intellectual Property Sciences, Inc.

(57) ABSTRACT

A fiber amplifier in which the active core is surrounded by a cladding and coupling of radiation between a core mode and cladding modes is suppressed to minimize cladding mode losses in a short wavelength range. An index profile is established in the active core and in the cladding such that the core exhibits a loss above a cutoff wavelength $\lambda_c$ and positive gains in the short wavelength range below the cutoff wavelength $\lambda_c$. Suppression of cladding mode losses is achieved by an arrangement for suppressing the coupling of radiation in the short wavelength range between a core mode supported the active core and a cladding mode supported by the cladding. The arrangement for suppressing can include an absorbing material or a scattering material distributed in the cladding. The arrangement for suppressing can include a non-phase-matched length section of the fiber amplifier in which the core mode and the cladding modes are not phase matched.

21 Claims, 8 Drawing Sheets

U.S. PATENT DOCUMENTS

| | | |
|---|---|---|
| 5,673,342 A | 9/1997 | Nelson et al. |
| 5,801,858 A | 9/1998 | Roberts et al. |
| 5,818,630 A | 10/1998 | Fermann et al. |
| 5,852,690 A | 12/1998 | Haggans et al. |
| 5,867,305 A | 2/1999 | Waarts et al. |
| 5,880,877 A | 3/1999 | Fermann et al. |
| 5,892,615 A | 4/1999 | Grubb et al. |
| 5,930,030 A | 7/1999 | Scifres |
| 5,933,271 A | 8/1999 | Waarts et al. |
| 5,963,700 A * | 10/1999 | Kato et al. .................. 385/127 |
| 6,005,999 A | 12/1999 | Singh et al. |
| 6,009,222 A | 12/1999 | Dong et al. |
| 6,021,141 A | 2/2000 | Nam et al. |
| 6,049,417 A | 4/2000 | Srivastava et al. |
| 6,118,575 A | 9/2000 | Grubb et al. |
| 6,154,321 A | 11/2000 | Melville et al. |
| 6,181,465 B1 | 1/2001 | Grubb et al. |
| 6,212,310 B1 | 4/2001 | Waarts et al. |
| 6,278,816 B1 | 8/2001 | Keur et al. .................... 385/29 |
| 6,301,271 B1 | 10/2001 | Sanders et al. |
| 6,307,994 B1 | 10/2001 | Paek et al. |
| 6,351,588 B1 | 2/2002 | Bhatia et al. |
| 6,445,494 B1 | 9/2002 | Nilsson et al. ............. 359/41.1 |
| RE38,086 E * | 4/2003 | Onishi et al. ............... 385/123 |
| 6,556,757 B2 | 4/2003 | Ellison et al. ............. 385/127 |

\* cited by examiner

SUPPRESSION OF CLADDING MODE LOSS IN FIBER AMPLIFIERS WITH DISTRIBUTED SUPPRESSION OF AMPLIFIED SPONTANEOUS EMISSION (ASE)

RELATED APPLICATIONS

This application is related to U.S. application Ser. No. 09/825,148 filed on Apr. 2, 2001, now U.S. Pat. No. 6,563,995, and to U.S. application Ser. No. 10/095,303 filed on Mar. 8, 2002.

FIELD OF THE INVENTION

The present invention relates generally to fiber amplifiers in fibers with distributed suppression of ASE where coupling between a core mode and cladding modes is suppressed to improve performance.

BACKGROUND OF THE INVENTION

The problem of amplifying optical signals for long distance transmission was successfully addressed by the development of Erbium doped fiber amplifiers (EDFAs). An EDFA consists of a length of silica fiber with an active core doped with ionized atoms ($Er^{3+}$) of the rare earth element Erbium. The fiber is pumped with a laser at a wavelength of 980 nm or 1480 nm. The doped, pumped fiber is optically coupled with the transmission fiber so that the input signal is combined with the pump signal in the doped fiber. An isolator is generally needed at the input and/or output to prevent reflections that would convert the amplifier into a laser. Early EDFAs provided 30 to 40 dB of gain in C-band extending between 1530 to 1565 nm with noise figures of less than 5 dB. Recently, EDFAs have been developed that provide similar performance in the L-band (1565 to 1625 nm). In addition, other fiber amplifiers using Nd, Pr, Tm and other active materials in their active core are used for various applications at various wavelengths.

The performance of fiber amplifiers depends on a number of parameters including pumping efficiency, level of population inversion of the ions in the active core, amplified spontaneous emission (ASE) competing with the useful amplified signal, cross-sections and refractive indices of the active core and of the cladding surrounding the active core. In many fiber amplifiers ASE is a major obstacle to effective amplification of the desired signal and thus ASE has to be suppressed. For example, in producing an EDFA for amplifying signals in the S-band the relatively high absorption losses and low gains over the S-band render the selection of fiber and fiber profile very difficult. The problems are so severe that the prior art teaches interposition of external filters between EDFA sections to produce an S-band EDFA.

For example, Ishikawa et al. disclose a method of fabricating an S-band EDFA by cascading five stages of silica-based EDFA and four ASE suppressing filters in Ishikawa et al., "Novel 1500 nm-Band EDFA with discrete Raman Amplifier", ECOC-2001, Post Deadline Paper. In Ishikawa et al.'s experimental setup, the length of each EDA is 4.5 meters. The absorption of each suppressing filter at 1.53 μm is about 30 dB and the insertion losses of each suppressing filter at 1.48 μm and 0.98 μm are about 2 dB and 1 dB respectively. The pumping configuration is bi-directional, using a 0.98 μm wavelength to keep a high population inversion of more than D≧0.7 (D, relative inversion) The forward and backward pumping powers are the same and the total pumping power is 480 mW. Ishikawa et al. show a maximum gain of 25 dB at 1518.7 nm with 9 dB gain tilt.

In a similar vein, U.S. Pat. No. 5,260,823 to Payne et al. teaches an EDFA with shaped spectral gain using gain-shaping filters. The inventors take advantage of the fact that the EDFA is distributed to interpose a number of the gain-shaping filters along the length of the EDFA, rather than just placing one filter at the end of the fiber. Yet another example of an approach using a number of filters at discrete locations in a wide band optical amplifier is taught by Srivastava et al. in U.S. Pat. No. 6,049,417. In this approach the amplifier employs a split-band architecture where the optical signal is split into several independent sub-bands, which then pass in parallel through separate branches of the optical amplifier. The amplification performance of each branch is optimized for the sub-band which traverses it.

Unfortunately, Payne's, Ishikawa's and Srivastava's methods are relatively complicated and not cost-effective, as they require a number of filters. Specifically, in the case of Ishikawa five EDFAs, four ASE suppressing filters and high pump power are required. Also, each of the ASE suppressing filters used by either method introduces an additional insertion loss of 1–2 dB. The total additional insertion loss is thus about 4–8 dB.

It has been found that the geometric and index profiles of a fiber can significantly affect the fiber's transmission characteristics. Most waveguides and fibers are designed to prevent injected radiation from coupling out via mechanisms such as evanescent wave out-coupling (tunneling), scattering, bending losses and leaky-mode losses. A general study of these mechanisms can be found in the literature such as L. G. Cohen et al., "Radiating Leaky-Mode Losses in Single-Mode Lightguides with Depressed-Index Claddings", IEEE Journal of Quantum Electronics, Vol. QE-18, No. 10, October 1982, pp. 1467–72. L. G. Cohen et al. teach that varying the cladding profile can improve various quality parameters of the guided modes while simultaneously maintaining low losses. Moreover, they observe that depressed-index claddings produce high losses to the fundamental mode at long wavelengths. Further, they determine that W-profile fibers with high index core, low index inner cladding and intermediate index outer cladding have a certain cutoff wavelength above which fundamental mode losses from the core escalate. These losses do not produce very high attenuation rates and, in fact, the authors study the guiding behavior of the fiber near this cutoff wavelength to suggest ways of reducing losses.

U.S. Pat. Nos. 5,892,615 and 6,118,575 teach the use of W-profile fibers similar to those described by L. G. Cohen, or QC fibers to suppress unwanted frequencies such as ASE and thus achieve higher output power in a cladding pumped fiber laser. Such fibers naturally leak radiation at long wavelengths, as discussed above, and are more sensitive to bending than other fibers. In fact, when bent the curvature spoils the W or QC fiber's ability to guide radiation by total internal reflection. The longer the wavelength, the deeper its evanescent field penetrates out of the core of the fiber, and the more likely the radiation at that wavelength will be lost from the core of the bent fiber. Hence, bending the fiber cuts off the unpreferred lower frequencies (longer wavelengths), such as the Raman scattered wavelengths, at rates of hundreds of dB per meter.

Unfortunately, the bending of profiled fibers is not a very controllable and reproducible manner of achieving well-defined cutoff losses. To achieve a particular curvature the fiber has to be bent, e.g., by winding it around a spool at just the right radius. Different fibers manufactured at different times exhibit variation in their refractive index profiles as well as core and cladding thicknesses. Therefore, the right radius of curvature for the fibers will differ from fiber to fiber. Hence, this approach to obtaining high attenuation rates is not practical in manufacturing.

In response to this problem more recent prior art teaches distributed suppression of ASE at wavelengths longer than a cutoff wavelength in fiber amplifiers such as EDFAs. This is achieved by engineering fiber parameters including the index profile and cross sections of the core and cladding layer including the use of a W-profile refractive index. The approach is discussed in more detail in U.S. patent application Ser. No. 10/095,303 filed on Mar. 8, 2002.

Although the teaching contained in the above application provides for effective distributed suppression of ASE in a fiber amplifier, the fiber cross-section enables the coupling of radiation at wavelengths below the cutoff wavelength between the core and the cladding. This effect, also known as cladding mode resonance, produces artifacts or cladding mode coupling losses in the short wavelength range of interest where the signal is to be amplified. For a general discussion of cladding mode coupling losses the reader is referred to Akira Tomita et al., "Mode Coupling Loss in Single-Mode Fibers with Depressed Inner Cladding", Journal of Lightwave Technology, Vol. LT-1, No. 3, September 1983, pp. 449–452.

Cladding mode loss is a problem encountered in fiber Bragg gratings. One solution is to extend a photosensitive region in the core beyond the core to suppress cladding mode losses as taught in U.S. Pat. No. 6,351,588 to Bhatia et al. entitled "Fiber Bragg Grating with Cladding Mode Suppression". U.S. Pat. No. 6,009,222 to Dong et al. also teaches to take advantage of a W-profile refractive index to confine the core mode and cladding modes thus reducing their overlap and coupling. Related alternatives to confining the core mode to suppress cladding mode losses are found in U.S. Pat. No. 5,852,690 to Haggans et al. and U.S. Pat. No. 6,005,999 to Singh et al.

Unfortunately, the approaches which are useful in suppressing cladding mode losses and avoiding cladding mode resonance in fiber Bragg gratings can not be applied to fiber amplifiers. That is because of fundamental differences in fabrication, construction and operating parameters between fiber Bragg gratings and fiber amplifiers with distributed suppression of ASE. Therefore, there is a need for fiber amplifiers having distributed suppression of ASE at wavelengths longer than a cutoff wavelength to be able to suppress cladding mode resonance or the coupling of radiation between the core and cladding at wavelengths shorter than the cutoff wavelength. It would be particularly useful to provide an EDFA having these capabilities where the wavelengths below the cutoff wavelength are contained in the S-band.

OBJECTS AND ADVANTAGES

It is a primary object of the present invention to provide a fiber amplifier with distributed suppression of amplified spontaneous emissions (ASE) above a certain cutoff wavelength and suppression of cladding mode loss at wavelengths shorter than the cutoff wavelength. In particular, it is an object of the invention to provide an Erbium-doped fiber amplifier having these capabilities.

Yet another object of the invention is to provide a method for designing fiber amplifiers with distributed ASE suppression and suppression of cladding mode loss below the cutoff wavelength.

These and numerous other advantages of the present invention will become apparent upon reading the following description.

SUMMARY

The objects and advantages of the invention are achieved by a fiber amplifier with suppressed cladding mode loss. The fiber amplifier has an active core and a cladding surrounding the active core. An index profile is established in the active core and in the cladding such that the core exhibits a loss above a cutoff wavelength $\lambda_c$ and positive gains in a short wavelength range below the cutoff wavelength $\lambda_c$. In accordance with the invention, the fiber amplifier has an arrangement for suppressing the coupling of a radiation in the short wavelength range between the active core and the cladding.

In some embodiments the arrangement for suppressing coupling between the active core and the cladding is a material distributed in the cladding. The material can be a scattering material or an absorbing material. For example, a rare earth element can be used as the absorbing material.

Preferably, the cladding has a depressed cladding having a depressed cladding cross-section and a refractive index $n_1$ and a secondary cladding having a secondary cladding cross-section and a refractive index $n_2$. The scattering or absorbing material is distributed in the secondary cladding. The radiation propagating in the active core occupies a mode having a mode diameter. The mode diameter extends from the active core into the cladding. It is important that the material be distributed outside the mode diameter of the radiation.

In some embodiments the arrangement for suppressing coupling between the active core and the cladding is a non-phase-matched length section in the fiber amplifier. The non-phase-matched length section is built such that coupling of the radiation between the active core and the cladding is not phase matched. In these embodiments the core has a core cross-section and a refractive index $n_0$ and the cladding has a cladding cross-section and a refractive index $n_{clad}$. The non-phase-matched length section is formed by a predetermined selection of the core cross-section, cladding cross-section and refractive indices $n_0$, $n_{clad}$. Preferably, the cladding has a depressed cladding having a depressed cladding cross-section and refractive index $n_1$, a secondary cladding having a secondary cladding cross-section and a refractive index $n_2$. The non-phase-matched length section is formed by a predetermined selection of the cross-sections and refractive indices $n_0$, $n_1$, $n_2$. Even more preferably, the cladding has an outer cladding having an outer cladding cross-section and a refractive index $n_3$ and $n_3$ is selected such that $n_3 < n_2$.

The fiber amplifier can contain any suitable active medium in its active core. For example, the active core can be doped with Neodymium or Erbium ions. When using Erbium, the fiber amplifier is an EDFA and in one advantageous embodiment its cutoff wavelength $\lambda_c$ is set near 1525 nm. Thus, the EDFA is pumped by a pump source delivering radiation at a pump wavelength near 980 nm. Under these conditions the EDFA can be used for amplifying signals in the short wavelength range falling within the S-band.

In accordance with the invention fiber amplifiers can be designed to suppress cladding mode loss. This is done in fibers where an appropriate index profile in the active core and cladding is established to set a cutoff wavelength $\lambda_c$. Cutoff wavelength $\lambda_c$ is set such that the fiber amplifier exhibits positive gains in a short wavelength range below the cutoff wavelength $\lambda_c$. The coupling of radiation in the short wavelength range between the core and cladding is suppressed. This is achieved by distributing a material that scatters or absorbs the radiation in the cladding of the fiber amplifier. Preferably, the material is located outside the mode diameter of the radiation propagating through the active core. In another embodiment, the coupling is suppressed by preventing phase matching such that the coupling of radiation between the core and cladding is not phase matched. This can be achieved by engineering the cross-sections and refractive indices of the core and cladding in accordance with the invention.

A detailed description of the invention and the preferred and alternative embodiments is presented below in reference to the attached drawing figures.

DETAILED DESCRIPTION

Figure 1:
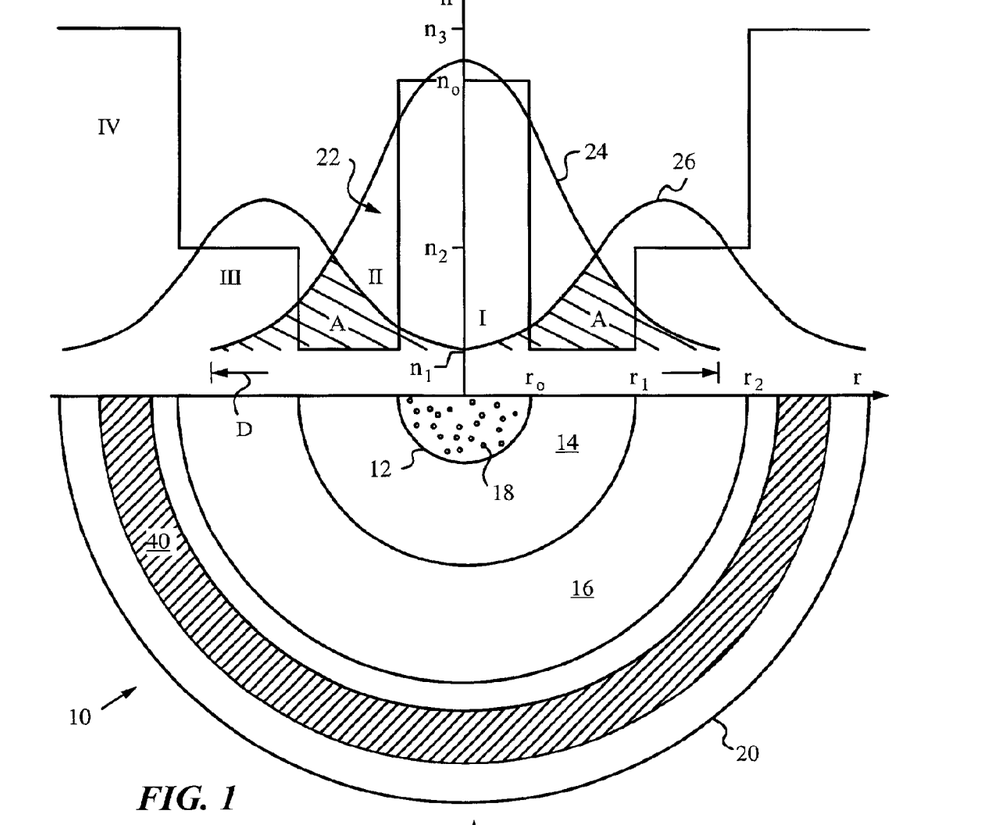
FIG. 1 is a diagram illustrating a partial cross-section of a fiber amplifier in accordance with the invention and illustrating a core mode and a cladding mode.

The instant invention will be best understood by initially reviewing the principles of a fiber amplifier 10 in accordance with the invention as illustrated in the diagram of FIG. 1. Specifically, fiber amplifier 10 has an active core 12. Core 12 is surrounded by a depressed cladding 14. Depressed cladding 14 is surrounded by a secondary cladding 16. Core 12 has a circular cross-section, as do depressed cladding 14 and secondary cladding 16. In addition, an outer cladding 20 of circular cross-section surrounds secondary cladding 16.

A region I associated with core 12 extends from $0 \leq r \leq r_0$, while depressed cladding 14 and secondary cladding 16 occupy regions II, III extending between $r_0 \leq r \leq r_1$ and $r_1 < r < r_2$. Outer cladding 20 is associated with a region IV extending from $r > r_2$. Core 12 has an index of refraction $n_o$, depressed cladding 14 has an index of refraction $n_1$ and secondary cladding 16 has an index of refraction $n_2$. Outer cladding 20 has an index of refraction $n_3$. The graph positioned above the partial cross-section of fiber amplifier 10 illustrates an average index profile 22 defined in fiber amplifier 10. In the present embodiment fiber amplifier 10 is a single mode fiber amplifier.

Fiber amplifier 10 has an active material 18 doped in core 12. Active material 18 is a lasing medium such as a rare earth ion or any other lasant that exhibits high gains in a long wavelength band and positive gains in a short wavelength band. Specifically, when pumped to a high relative inversion D, the high gains of active material 18 in the long wavelength band cause amplified spontaneous emissions (ASE) or lasing which reduces the population inversion of lasant 18 and thus reduces the positive gains in the short wavelength band.

Referring back to FIG. 1, superposed on average index profile 22 is an intensity distribution of radiation in a guided fundamental core mode 24 at a first wavelength $\lambda_1$ where $\lambda_1 < \lambda_c$. First wavelength $\lambda_1$ is contained within a short wavelength band where active material 18 exhibits positive gains. An intensity distribution of radiation in a cladding mode 26 that exhibits an oscillating intensity distribution beyond core 12 and depressed cladding 14 is also shown. There is an overlap between core mode 24 and cladding mode 26 as indicated by hatched areas A. However, as with all modes of waveguide structures, these modes are orthogonal (cladding mode 26 is anti-symmetric in electric field) in the ideal case. Hence, ideally there is no coupling between core mode 24 and cladding mode 26. However, all real waveguides have imperfections, inhomogeneities, scattering centers and perturbations which break the orthogonality and enable coupling between core and cladding modes. In fact, the three main causes of coupling in fiber amplifier 10 are manufacturing defects, bending or coiling of fiber amplifier 10 as necessary for packaging purposes, and micro bends and stresses which are pre-existing (e.g., frozen in during manufacturing) or caused during packaging. Clearly, it is beneficial to reduce these causes for coupling as far as possible.

Figure 2:
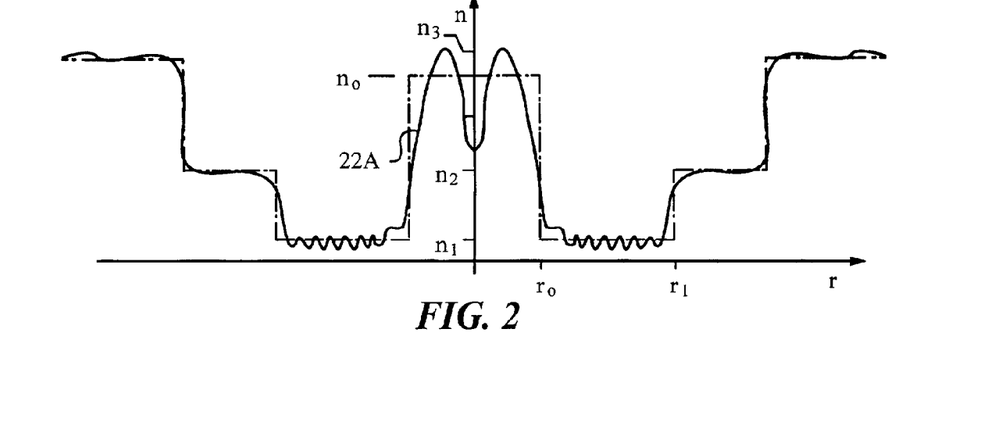
FIG. 2 is a graph illustrating a typical index profile in the fiber of FIG. 1.

FIG. 2 illustrates a refractive index profile 22A as is obtained with normal manufacturing techniques. For the purposes of the invention it is sufficient that the radially varying index of core 12 have an average value equal to $n_o$. Likewise, it is sufficient that indices of depressed cladding 14, secondary cladding 16 and outer cladding 20 average out to the values $n_1$, $n_2$, $n_3$. The average index $n_0$ of core 12 is significantly higher than index $n_1$ of depressed cladding 14 and index $n_2$ of secondary cladding 16. In this embodiment, the average index $n_3$ of outer cladding 20 is higher than all other indices, although this need not be so.

The selection of appropriate values of indices $n_0$, $n_1$, $n_2$ and radii $r_0$, $r_1$, $r_2$ is made to achieve certain guiding properties of fiber amplifier 10, as required by the instant invention. In particular, index profile 22A is established in core 12 and in the first two cladding layers, i.e., depressed cladding layer 14 and secondary cladding layer 16 such that radiation in core 12 exhibits a loss above a cutoff wavelength $\lambda_c$ and positive gains in a short wavelength range below the cutoff wavelength $\lambda_c$. In a preferred embodiment, index profile 22A is engineered to have a fundamental mode cutoff wavelength $\lambda_c$ such that radiation in fundamental mode 24 at wavelengths smaller than $\lambda_c$ is retained in core 12 while radiation in fundamental mode 24 at wavelength $\lambda_c$ or longer wavelengths is lost to secondary cladding 16 over a short distance. An exemplary engineering method of the refractive index profile 22A will now be discussed.

Fundamental mode cutoff wavelength $\lambda_c$ of fiber 10 is a wavelength at which the fundamental mode (the $LP_{01}$ mode) transitions from low-losses to high losses in core 12, i.e., is cut off from core 12. First, the fundamental mode cutoff wavelength $\lambda_c$ for fiber amplifier 10 is set in accordance to selection rules for cross-sections and refractive indices $n_0$, $n_1$ and $n_2$ of fiber amplifier 10 as derived from Maxwell's equations. In the weak guiding approximation (which is valid when the indices of refraction of core 12 and claddings 14, 16 are all relatively close to each other), the Maxwell vector equations can be replaced with a scalar equation. The scalar $\psi$ represents the strength of the transverse electric field in the fiber. For more information, see for example G. Agrawal, "Nonlinear Fiber Optics" (Academic, San Diego, 1995), D. Marcuse, "Light Transmission Optics" (Van Nostrand, Princeton, 1972), and D. Marcuse, "Theory of Dielectric Optical Waveguides" (Academic, New York, 1974).

For convenience, let us define the following parameters:

$$u_0 = \sqrt{n_0^2 - n_2^2} \text{ and } u_1 = \sqrt{n_2^2 - n_1^2} \quad (1)$$

The scalar field $\psi$ inside fiber amplifier 10 satisfies a wave equation whose solutions are Bessel functions and modified Bessel functions. For the fundamental mode supported by fiber 10, inside core 12 the scalar field is thus:

$$\psi = J_0(\kappa r), \ 0 \leq r \leq r_0 \text{ (region } I\text{)} \quad (2)$$

where $\kappa$ is an eigenvalue that needs to be determined, and $J_0$ is the zeroth Bessel's function.

Inside depressed cladding 14, the scalar field $\psi$ is:

$$\psi = A K_0(\beta r) + B I_0(\beta r), \quad r_0 \leq r \leq r_1 \text{ (region II)} \quad (3)$$

where A and B are constants to be determined, $\beta^2 = (u_0^2 + u_1^2)(2\pi/\lambda)^2 - \kappa^2$, and $K_0$ and $I_0$ are the modified Bessel's functions. Here $\lambda$ is the vacuum wavelength of the radiation.

In secondary cladding 16, we obtain:

$$\psi = C K_0(\gamma r), \quad r \geq r_1 \text{ (region III)} \quad (4)$$

Here C is another constant, and $\gamma^2 = u_0^2(2\pi/\lambda)^2 - \kappa^2$. A, B, C, and $\kappa$ are found using the boundary conditions, which require that $\psi$ and its first derivative are both continuous at $r_0$ and $r_1$.

It can be shown that fundamental mode cutoff wavelength $\lambda_c$ is a wavelength $\lambda$ at which $\gamma=0$. (See for example, Cohen et al., IEEE Journal of Quantum Electronics, QE-18 (1982) 1467–1472.)

For additional convenience, let us define the following parameters:

$$x = \frac{2\pi u_0 r_0}{\lambda_c}, \quad \rho = u_1/u_0, \quad s = r_1/r_0. \quad (5)$$

Now, fundamental mode cutoff wavelength $\lambda_c$ can be determined if parameter x is determined. That determination can be made with the aid of algebra known to a person skilled in the art, since parameter x is the root of the following equation:

$$\rho J_0(x) K_1(\rho x) I_1(\rho s x) - \rho J_0(x) I_1(\rho x) K_1(\rho s x) - J_1(x) K_1(\rho s x) I_0(\rho x) - J_1(x) I_1(\rho s x) K_0(\rho x) = 0. \quad (6)$$

Three observations should be made regarding the parameter x. First, x does not exist for all values of s and $\rho$. For example, for $\rho=1$ and $s \leq \sqrt{2}$, there is no x that satisfies Eq. (6). This means that all wavelengths are guided in core 12 in this regime. The criterion that Eq. (6) have a solution is:

$$s^2 \geq 1 + 1/\rho^2. \quad (7)$$

Second, for practical applications x cannot be too small. This is because, according to Eq. (5), the parameter x is proportional to radius $r_0$ of core 12, and the radius has to be large enough that it is easy to couple radiation into and out of core 12. (A smaller core 12 also makes the nonlinear effects stronger, which is often a disadvantage.) Therefore, since $x = 2\pi u_0 r_0/\lambda_c$, preferably $x \geq 1$. This implies that $\rho \geq 0.224$ or, in terms of the refractive indices $$\sqrt{(n_2^2 - n_1^2)/(n_0^2 - n_2^2)} \geq 0.224.$$

Third, it is evident from Eq. 7 that for larger values of s, the value of x only weakly depends on s. Thus it is advantageous to have a fiber in this region of parameter space, since a manufacturing flaw producing an error in s will have a small effect on the value of fundamental mode cutoff wavelength $\lambda_c$. Therefore, it is convenient to use the rule $s \geq 1 + 1/\rho$, or terms of the refractive indices:

$$\frac{r_1}{r_0} \geq 1 + \sqrt{(n_0^2 - n_2^2)/(n_2^2 - n_1^2)}. \quad (8)$$

The selection of cross sections and refractive indices of core 12, depressed cladding 14 and outer cladding 16 is guided by the above rules in setting the appropriate fundamental mode cutoff wavelength $\lambda_c$. First, $\lambda_c$ can be preselected, e.g. a wavelength close to 1530 nm, and then convenient values are selected for $u_0$ and $r_0$. Based on these choices x is computed from equation 5, and conveniently $x \geq 1$ (otherwise the previous choices can be adjusted). Then, suitable values of s and $\rho$ are found using equation 6. A range of values for $\rho$ and s will yield desired $\lambda_c$. Typically, all values of $\rho$ are larger than 0.224. In addition, the rule of equation 8 is used to further narrow the range of suitable values of $\rho$ and s.

Finally, the values of s and $\rho$ have an additional limitation. Namely, they must be selected so that core 12 of fiber amplifier 10 has a great enough loss, e.g., as low as 10 dB/m and as high as 1,000 dB/m or even more at a wavelength $\lambda > \lambda_c$. To find the loss at wavelength $\lambda > \lambda_c$, the fiber modes for radiation having wavelength $\lambda > \lambda_c$ are required.

Equations (2), (3), and (4) specify the fundamental mode when $\lambda < \lambda_c$. When $\lambda > \lambda_c$, the function $\psi$ is oscillatory, rather than exponentially decaying, in secondary cladding 16. Therefore when $\lambda > \lambda_c$, Eq. (4) is replaced by:

$$\psi = C J_0(q r) + D N_0(q r), \quad r \geq r_1 \text{(region III)} \quad (9)$$

where $N_0$ (also called $Y_0$) is the zeroth Neumann function, $q^2 = \kappa^2 - u_0^2(2\pi/\lambda)_2$, and C and D are constants to be determined.

There are two key items to note regarding the modes for $\lambda > \lambda_c$. First, there are five unknowns (A, B, C, D, and $\kappa$) and four boundary conditions (continuity of $\psi$ and $d\psi/dr$ at $r_0$ and $r_1$). The equations are underconstrained: $\kappa$ may be chosen to be any value between 0 and $$(2\pi/\lambda)\sqrt{u_0^2 + u_1^2}.$$

Thus, there is a continuum of states for each $\lambda > \lambda_c$, corresponding to the continuum of values that $\kappa$ may have. This situation is quite different from the case $\lambda < \lambda_c$, where four unknowns (A, B, C, and $\kappa$) are fixed by the four boundary conditions, resulting in $\kappa$ being a discrete eigenvalue having a unique value at each $\lambda < \lambda_c$.

Second, the modes specified by Eqs. (2), (3), and (9) are eigenmodes of the fiber, e.g. a W-fiber; however, these modes do not correspond to the situation that is physically realized. This is a result of Eq. (9) containing both incoming and outgoing waves, whereas in practice only outgoing waves are present (the radiation at wavelength $\lambda > \lambda_c$ originally propagating in core 12 radiates out).

Nevertheless, the modes of Eqs. (2), (3), and (9) can be used to estimate the losses at wavelengths greater than $\lambda_c$. First, for a given wavelength $\lambda$, find the value of $\kappa$ that minimizes $C^2 + D^2$. This corresponds to the mode that is the most long-lived within the core. (An analogy can be made between the wave equation for the scalar $\psi$ in the fiber and the quantum mechanical wave equation for a particle in a potential well. Then the quantum mechanical results can be borrowed. See for example David Bohm, "Quantum Theory", Dover 1989, Chapter 12 §14–22.)

Second, once $\kappa$ is found in the above manner, the outgoing waves can be computed from Eq. (9). These outgoing waves give a reasonable estimation of the loss from core 12 into secondary cladding 18, even when no incoming waves are present. These outgoing waves will cause beam at wavelength $\lambda > \lambda_c$ propagating in core 12 to be attenuated along the length of the fiber. If the beam has power P, then the change in power P with distance z along fiber amplifier 10 is described by the equation:

$$\frac{dP}{dz} = -\Lambda P. \quad (10)$$

The loss is given by the coefficient $\Lambda$, which is approximately:

$$\Lambda = \frac{\lambda}{4\pi^2 n_0} \frac{C^2 + D^2}{\int_0^{r_0} r\, dr\, \psi^* \psi}. \quad (11)$$

The loss $\Lambda$, having units of m$^{-1}$, can be converted to a loss $\beta$ in units dB/m, using the relation:

$$\beta = 10\, \log_{10}(e)\cdot\Lambda. \quad (12)$$

Here the term "loss" refers to radiation that leaks out of core 12 into secondary cladding 16. In fact, the radiation may not be truly lost from fiber amplifier 10 at this point, as will be discussed below.

Another method for calculating the losses involves calculating the complex propagation constant of the leaky fundamental mode of fiber amplifier 10. Leaky modes are discussed in, for example, D. Marcuse, "Theory of Dielectric Optical Waveguides" (Academic, New York, 1974) Chapter 1. The loss is related to the imaginary part of the complex propagation constant of the leaky mode. The complex propagation constant, or its equivalent that is the complex effective index of refraction, may be computed using commercially available software, such as that obtainable from Optiwave Corporation of Nepean, ON, Canada.

In some cases it may be preferable to numerically solve for the modes of a given fiber rather than use the Bessel function approach outlined above, since real fibers do not have the idealized step index profile indicated by profile 22 shown in FIG. 1, but have variations from the ideal as shown by graph 22A in FIG. 2 of the actual refractive index profile obtained in practice. In particular, the most common method of single-mode fiber manufacture today involves the Modified Chemical Vapor Deposition (MCVD) process and solution doping process, which typically leaves an index dip in the center of core 12, as shown by graph 22A. Numerical solutions can, more easily than the method described above, take into account the actual variations in refractive index as a function of radius. Such numerical calculations can again give fundamental mode cutoff wavelength $\lambda_c$ and fiber losses as a function of fiber parameters including cross-sections and refractive indices, allowing fiber amplifier 10 to be designed to exhibit the desired features.

When Eq. (11) is used to estimate the loss, refractive indices $n_0$, $n_1$, and $n_2$ will in general be average indices of refraction of profile 22, since the actual indices of refraction will vary somewhat as a function of radius (see profile 22A). Also, the index of refraction n is not necessarily radially symmetric. If the cross section of fiber amplifier 10 is described by polar coordinates r and $\kappa$ the refractive index may depend upon the angle $\kappa$ as well as the radius r. Thus, $n = n(r,\theta)$. Such an asymmetric fiber may be desirable for polarization maintenance, for example.

Here is the prerequisite for the fiber to have fundamental mode cutoff wavelength $\lambda_c$. Let R be a radius large enough that the index at radius R has substantially leveled off to the value $n_2$. Then fiber amplifier 10 will have fundamental mode cutoff wavelength $\lambda_c$ if (see B. Simon, Ann. Phys. 97 (1976), pp. 279):

$$\int_0^{2\pi} d\theta \int_0^R r\, dr(n^2(r,\theta) - n_2^2) \le 0. \quad (13)$$

Note that given the profile of FIG. 1, Eq. (13) becomes:

$$\pi r_0^2 u_0^2 - \pi(r_1^2 - r_0^2)u_1^2 \le 0, \quad (14)$$

which is equivalent to Eq. (7) above.

Fundamental mode cutoff wavelength $\lambda_c$ is the largest wavelength for which there is an eigenmode that is localized in region I.

The losses for wavelengths above cutoff wavelength $\lambda_c$ can be determined, for example, by (i) solving for the modes that are not localized but include incoming and outgoing waves, (ii) for each wavelength finding the mode with the smallest outgoing intensity, and (iii) using this outgoing intensity to estimate the loss. As discussed above, other methods are also available to a person skilled in the art for calculating losses. In general, fiber amplifier 10 with a desired fundamental mode cutoff wavelength $\lambda_c$ and losses can therefore be designed by adjusting the profile $n(r,\kappa)$, which is equivalent to adjusting the cross-sections and refractive indices of core 12, depressed cladding 14 and secondary cladding 16.

The rules presented above will enable a person skilled in the art to set fundamental mode cutoff wavelength $\lambda_c$ by making a selection of $r_0$, $r_1$, $n_0$, $n_1$ and $n_2$. Specifically, cutoff wavelength $\lambda_c$ is set such that core 12 exhibits a loss above cutoff wavelength $\lambda_c$ and positive gains due to active material 18 in a short wavelength range below the cutoff wavelength $\lambda_c$. This selection of $r_0$, $r_1$, $n_0$, $n_1$ and $n_2$ provides distributed ASE suppression at wavelengths longer than cutoff wavelength $\lambda_c$ over the length of fiber amplifier 10.

Referring back to FIG. 1, superposed on average index profile 22 is the intensity distribution of radiation in guided fundamental core mode 24 at a first wavelength $\lambda_1$ where $\lambda_1 < \lambda_c$ and the intensity of radiation in cladding mode 26. Radiation in core mode 24 and in cladding mode 26 propagates at first wavelength $\lambda_1$. In other words, single mode fiber amplifier 10 allows for discrete modes, such as mode 26 to propagate in secondary cladding 16. In fact, substantial power can be transferred from core mode 24 to cladding modes such as cladding mode 26 when the phase velocities of core mode 24 and cladding mode 26 become identical. For a theoretical teaching on the cladding mode coupling effect the reader is referred to Akira Tomita et al., "Mode Coupling Loss in Single-Mode Fibers with Depressed Inner Cladding", Journal of Lightwave Technology, Vol. LT-1, No. 3, September 1983, pp. 449–452.

The transfer of power from core mode 24 to cladding mode 26 causes losses from core 12 at wavelength $\lambda_1$. Thus, a signal at $\lambda_1$ within the short wavelength band is not able to take advantage of the full positive gains of active material 18 at $\lambda_1$. As used herein, these losses are referred to as cladding mode losses. In certain cases, some power is also transferred back from cladding mode 26 to core mode 24 when coupling exists between core mode 24 and cladding mode 26. As used herein, this condition is referred to as cladding mode resonance.

Figure 3:
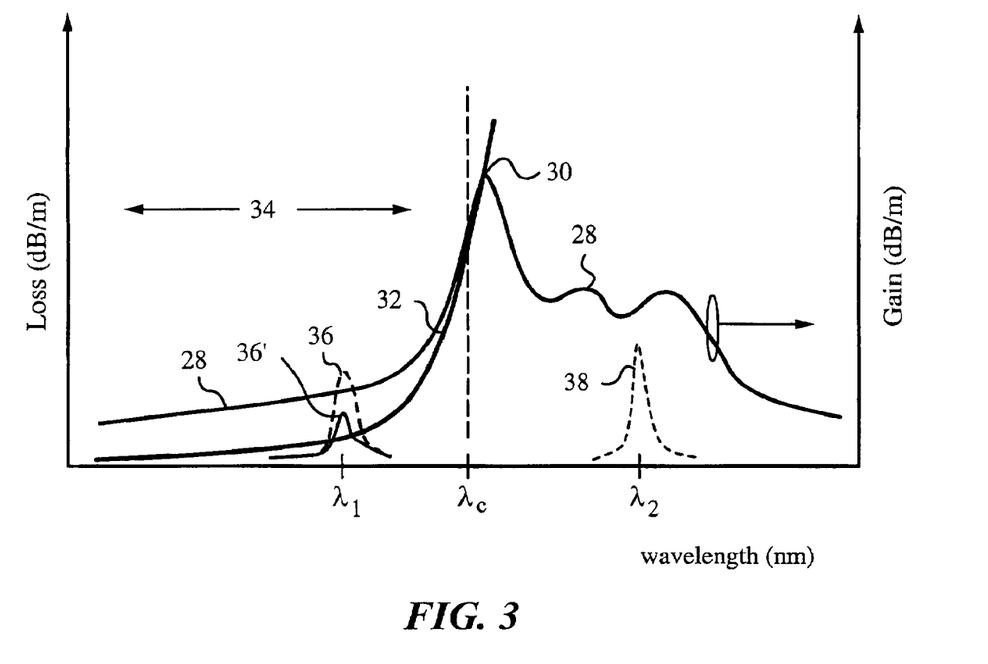
FIG. 3 is a graph illustrating the effects of cladding mode losses in the fiber of FIG. 1.

The general effect of cladding mode losses sustained by fiber amplifier 10 is shown in FIG. 3. In this example Erbium is used as active material 18 and the short wavelength band is within the S-band. Specifically, graph 28 shows the gains of Erbium around its peak 30 at about 1530 nm. The design of refractive index profile of fiber 10 sets cutoff wavelength $\lambda_c$ just below 1530 nm, e.g., at 1525 nm and produces a loss curve 32. Loss curve 32 indicates that the losses above cutoff wavelength $\lambda_c$ increase rapidly. Thus, any ASE due to the gains of Erbium at 1530 nm and at longer wavelengths is effectively suppressed.

Meanwhile, in short wavelength band 34 below cutoff wavelength $\lambda_c$ Erbium exhibits gains above the losses produced by loss curve 32. In other words, the Erbium has positive gains in short wavelength band 34 and is therefore able to amplify signals in short wavelength band 34.

Due to coupling between fundamental mode 24 and cladding mode 26 at wavelength $\lambda_1$ there is a loss peak 36 in short wavelength band 34 centered at $\lambda_1$. The size of loss peak 36 is not drawn to scale and is indicated in dashed lines. It should be noted that in practice there can be a number of wavelengths within short wavelength band 34 at which coupling between core mode and cladding mode occurs producing corresponding loss peaks. Also, it should be noted that coupling between fundamental core modes and cladding modes at wavelengths longer than $\lambda_c$ can take place as well. For example, core mode and cladding mode coupling occurs at $\lambda_2$. The corresponding cladding mode resonance 38 is indicated in dashed lines. Because ASE in the wavelength range spanning $\lambda_2$ is suppressed, this coupling is not as detrimental to the function of fiber amplifier 10. Still, cladding mode coupling at wavelengths longer than $\lambda_c$ should also be avoided, in the preferred embodiment.

Clearly, loss peak 36 reduces the effectiveness of fiber amplifier 10 at wavelength $\lambda_1$. Therefore, in accordance with the invention, loss peak 36 is suppressed by suppressing cladding mode loss in fiber amplifier 10. In the general case, as well as in this embodiment, this object is achieved by providing an arrangement for suppressing the coupling of radiation in the short wavelength range between active core 12 and secondary cladding 16. In the embodiment of FIG. 1, the arrangement for suppressing coupling employs a material 40 distributed in outer cladding 20.

Material 40 is a scattering material or an absorbing material. In either case, material 40 is embedded in outer cladding 20 at a distance where core mode 24 is negligibly small. In particular, core mode 24 has a mode diameter D extending from core 12 into the cladding, i.e., into depressed cladding 14 and secondary cladding 16. Material 40 is distributed outside the mode diameter of core mode 24. Thus, core mode 24 does not exhibit appreciable intensity in the region where material 40 is deposited within outer cladding 20. This means that in single mode fiber amplifier 10 material 40 should be embedded several tens of microns away from core 12. It should be noted that outer cladding 20 can be made up entirely of material 40 if outer cladding 20 commences at a distance where core mode 24 is negligibly small.

In the embodiment where material 40 is an absorber, it can be a rare earth element doped into outer cladding 20. Suitable materials include Erbium, Cobalt, Samarium and other suitable absorbers. Material 40 can be embedded in outer cladding 20 using any suitable fabrication technique. For example, in a typical manufacturing process employing the "sleeving technique" a sleeve of pure silica that is to be pulled over secondary cladding 16 can be provided with a layer of doped material 40 prior to the sleeving process. Specifically, a layer of doped material 40 coated onto the inner surface prior to the sleeving process can be employed. Modified Chemical Vapor Deposition (MCVD) and solution doping, followed by sintering can be used to create the proper layer of absorbing material 40.

In another embodiment, material 40 is any suitable scattering material, such as an inhomogeneous acrylate layer or other material exhibiting rapid variations in the refractive index and/or geometry. Scattering material can employ two scattering effects. First, it can scatter radiation in cladding mode 26 that is phasematched with core mode 24 into an assortment of other cladding modes. Typically there will be a large number (usually hundreds) of other cladding modes into which radiation of cladding mode 26 can be scattered. This effect is substantially equivalent to absorption loss as far as cladding mode 26 is concerned. Alternatively, radiation in cladding mode 26 can be perturbed in phase in a random fashion by scattering material 40. This effect is substantially similar to preventing phase matching between core mode 24 and cladding mode 26. By preventing phase matching the accumulation of cladding mode loss over a long distance of fiber amplifier 10 is thus prevented.

Figure 4:
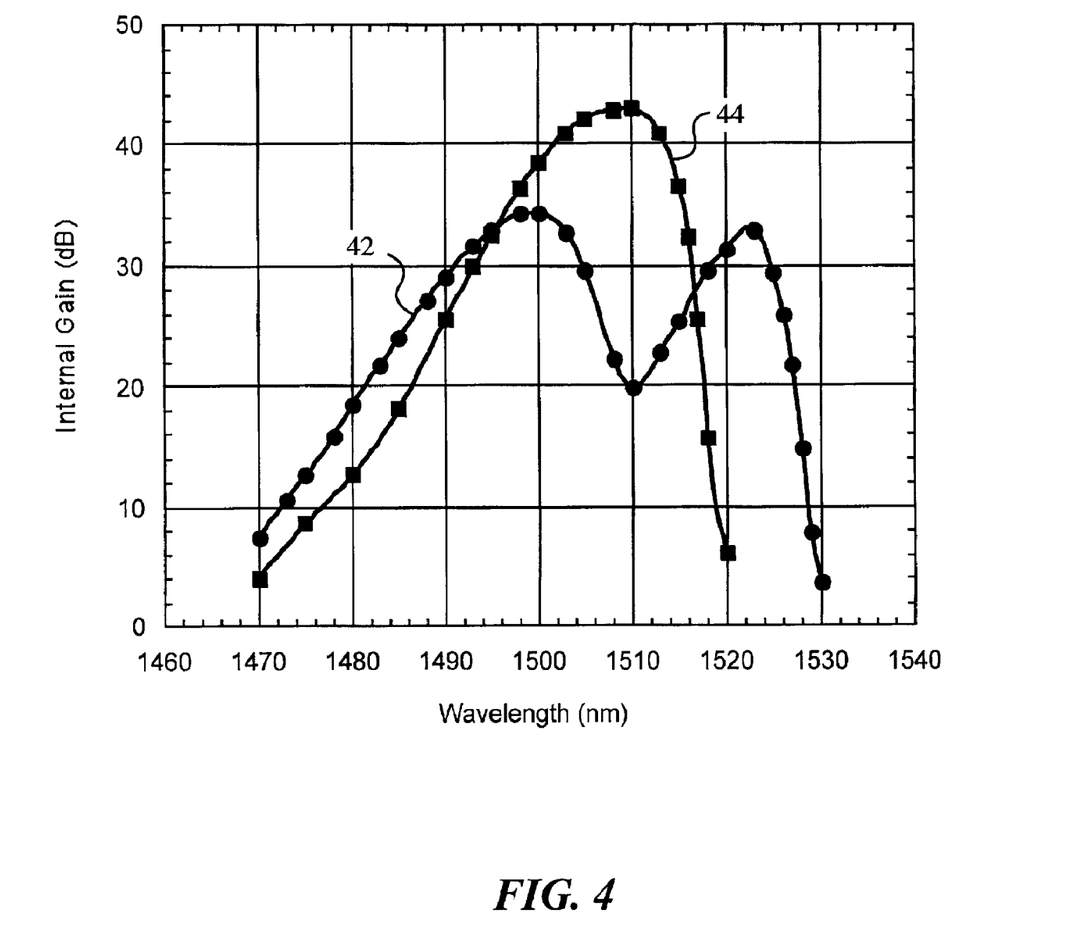
FIG. 4 are graphs illustrating the effects of an absorbing polymer material embedded in outer cladding of the fiber of FIG. 1.

The effect of using material 40 in outer cladding 20 is illustrated in FIG. 3. Specifically, by using material 40 loss peak 36 at $\lambda_1$ is reduced to a smaller loss peak 36' indicated in solid line. FIG. 4 illustrates the experimental results of using absorbing material 40 in the form of a polymer buffer in outer cladding 20 of fiber amplifier 10. In this case, the host material of fiber 10 is silicate-containing glass such as alumino-germanosilicate glass or phosphorus doped germanosilicate glass. Graph 42 indicates the gain experienced by a signal in fiber 10 without material 40 in outer cladding 20 and graph 44 indicates the gain obtained with material 40. In these cases both material 40 and outer cladding 20 are made of a polymer materials with differing loss characteristics. Clearly, the dip in gain associated with loss peak 36 is removed with the aid of absorbing material 40. Thus, fiber amplifier 10 of present invention provides distributed suppression of amplified spontaneous emissions (ASE) above cutoff wavelength $\lambda_c$ and suppresses cladding mode loss at wavelengths shorter than cutoff wavelength $\lambda_c$, i.e., wavelengths in short wavelength range 34 such as wavelength $\lambda_1$ in particular. It should be noted that the presence of absorbing material 40 in outer cladding 20 also suppresses cladding mode effects at $\lambda_2$.

Figure 5:
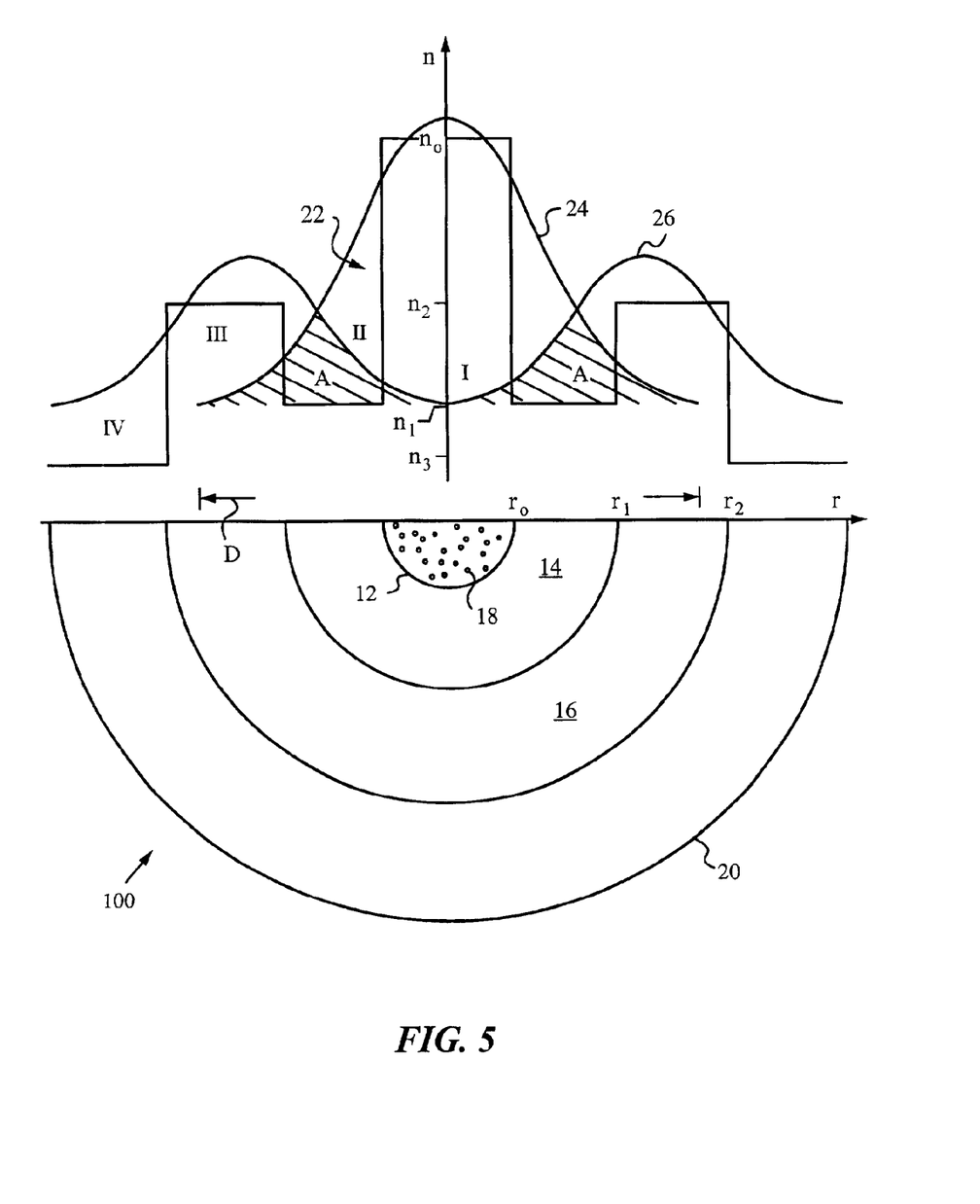
FIG. 5 is a diagram illustrating a partial cross-section of another fiber amplifier according to the invention.

FIG. 5 illustrates a partial cross-section of another fiber amplifier 100 in accordance with the invention. Parts of fiber amplifier 100 corresponding to those of fiber amplifier 10 are referenced by the same reference numbers. In fiber amplifier 100 the arrangement for suppressing coupling between core mode 24 and cladding mode 26 is a non-phase-matched length section of fiber amplifier 100. In the non-phase-matched length section outer cladding 20 has a lower refractive index $n_3$ than all other indices. Most importantly, refractive index $n_3$ is lower than refractive index $n_2$ of secondary cladding 16, i.e., $n_3 < n_2$. This condition ensures that radiation in core mode 24 and cladding mode 26 are not phase matched. Appropriate material for outer cladding 20 to ensure such low refractive index $n_3$ is silicone, Teflon, Fluorine-doped silica and other low-index materials such as those used in dual clad fibers well known to those skilled in the art.

Figure 6:
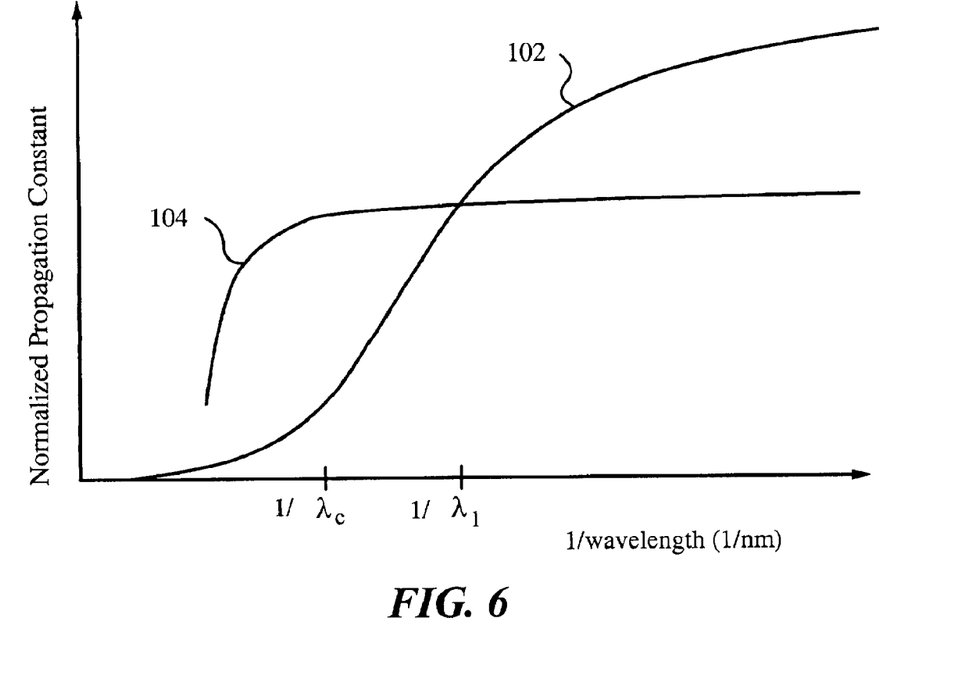
FIG. 6 is a graph illustrating the phase-matching condition between core modes and cladding modes in the fiber amplifier of FIG. 5.

Prevention of phase matching and the selection of the value of refractive index $n_3$ will be better understood by referring to the graphs in FIG. 6. Graph 102 illustrates the normalized propagation constant of radiation in core mode 24 plotted versus inverse of the wavelength (i.e., optical frequency, which is also proportional to the k-vector) for $n_3 \geq n_2$. Graph 104 illustrates the normalized propagation constant of radiation in cladding mode 26 also plotted versus inverse of the wavelength for $n_3 \geq n_2$. (The condition $n_3 \geq n_2$ is typical for telecommunications fibers which use acrylate as the typical outer cladding also referred to as buffer.) At $1/\lambda_1$ graphs 102 and 104 intersect indicating phasematching and hence cladding mode loss.

Figure 7:
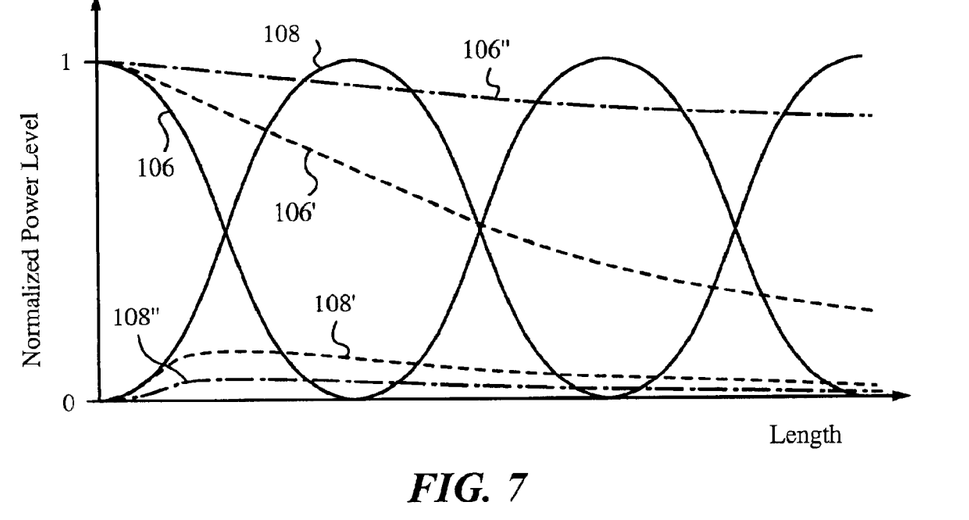
FIG. 7 are graphs of power levels of radiation in core mode and cladding mode.

Graphs 106 and 108 in FIG. 7 illustrate the power level of radiation normalized to the value 1 (100% power level) in core mode 24 and cladding mode 26, respectively. Graphs 106 and 108 are observed for the phasematched condition and are graphed as a function of length of fiber amplifier 100 assuming an ideal case in which no power is lost or gained (i.e., no amplification). The power level of core mode 24 represented by graph 106 starts at the high power value of 1 and undergoes sinusoidal oscillations between 1 and 0. In contrast, the power level of cladding mode 26 starts at the low power value of 0 and undergoes sinusoidal oscillation between 0 and 1. Clearly, power is transferred from core mode 24 to cladding mode 26 during the first part of the oscillation and back from the cladding mode 26 to core mode 24 during the second part of the oscillation.

In practice, outer cladding 20 has a loss of a finite value a per unit length of fiber amplifier 100 while the loss in core 12 is negligible. Therefore, the power in core mode 24 will not manage to be coupled completely into cladding mode 26. Under these conditions, the power level in core mode 24 will follow a graph 106' and the power level in cladding mode 26 will follow a graph 108' as shown for an intermediate value of α. At a large value of α the power levels will follow graphs 106" and 108". The cladding mode loss prevents appreciable power from building up in cladding mode 26, thereby reducing the coupling of power from core mode 24 to cladding mode 26. In fact, the loss of power γ from core mode 24 to cladding mode 26 can be described by the following equation:

$$\gamma = \frac{8.7c^2}{\alpha}, \quad (15)$$

where $c^2$ is the speed of light squared. From this equation it is evident that increasing the loss α experienced by cladding mode 26 decreases the loss experienced by core mode 24. For a detailed derivation of the equation the reader is referred to Akira Tomita et al., "Mode Coupling Loss in Single-Mode Fibers with Depressed Inner Cladding", Journal of Lightwave Technology, Vol. LT-1, No. 3, September 1983, pp. 449–452.

Figure 8A:
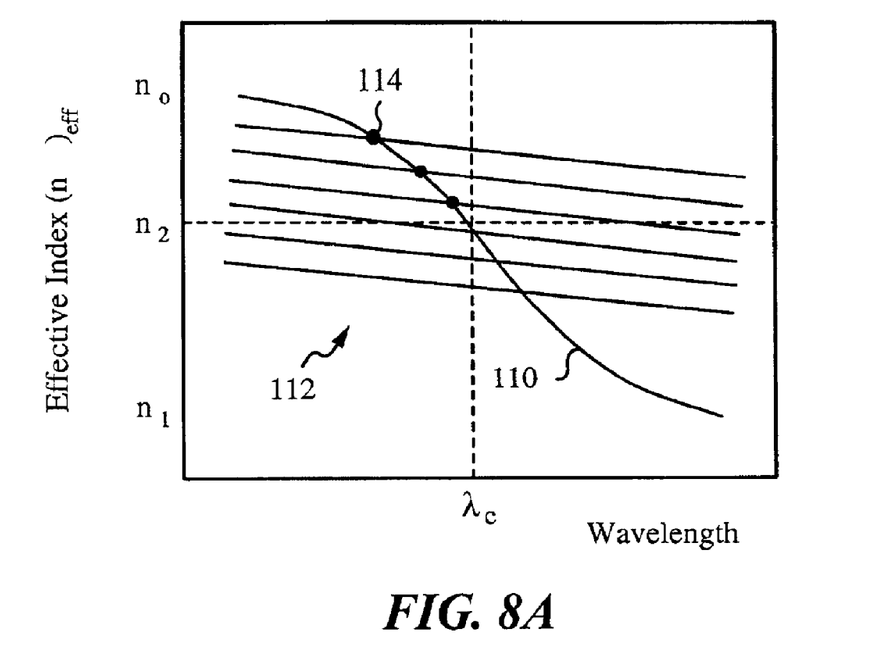
FIGS. 8A&B are graphs illustrating the effective index $n_{eff}$ experienced by the core mode and cladding modes.
Figure 8B:
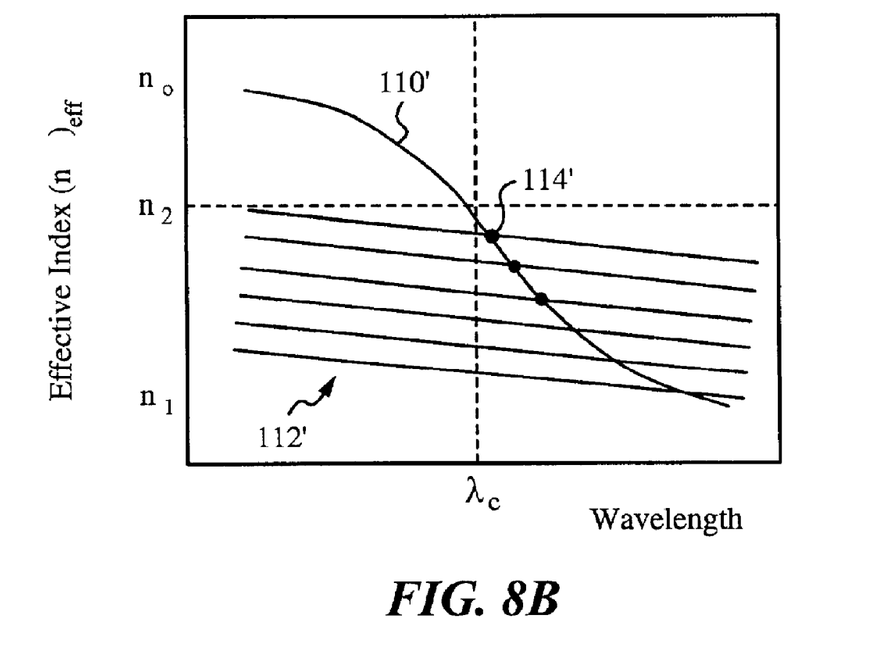

Now, changing the refractive index $n_3$ of outer cladding 20 has the effect of shifting the phasematching wavelength $\lambda_1$ and can be used to eliminate coupling of radiation from core mode 24 to cladding mode 26 in accordance with the invention. Graphs 110 and 110' in FIGS. 8A and 8B illustrate the effective index $n_{eff}$ experienced by core mode 24 when $n_3 > n_2$ or $n_3 < n_2$, respectively. Because a change in $n_3$ does not affect core mode 24 appreciably, graphs 110 and 110' are almost identical. The effective indices of a number of cladding modes, including cladding mode 26 are indicated by lines 112 and 112', respectively.

In FIG. 8A the condition $n_3 > n_2$ dictates that the effective indices of cladding modes can exceed $n_2$. In fact, the effective index of core mode 24 intersects with the effective index of cladding mode 26 at intersection point 114 in the short wavelength range below cutoff wavelength $\lambda_c$. Furthermore, effective index of core mode 24 also intersects with the effective indices of two additional cladding modes in this case. Therefore, cladding mode losses due to coupling between core mode 24 and cladding mode 26 as well as coupling between core mode 24 and the two additional cladding modes exist. The coupling behavior is as indicated by graphs 106', 106" and 108', 108" in FIG. 7 (depending on the value of cladding loss α) and causes the undesired cladding mode loss.

On the other hand, when $n_2 > n_3$ the effective indices of cladding modes cannot exceed $n_2$, as shown in FIG. 8B. Thus, the effective index of core mode 24 does not intersect with any cladding modes below cutoff wavelength $\lambda_c$. Therefore, there is no coupling between core mode 24 and cladding mode 26 or any other cladding mode below cutoff wavelength $\lambda_c$. In fact, the intersection point 114' between core mode 24 and cladding mode 26 occurs above cutoff wavelength $\lambda_c$ in the long wavelength range in which ASE is being suppressed by the design of fiber amplifier 100, as discussed above. The same is true for coupling from core mode 24 to the other cladding modes.

Figure 9:
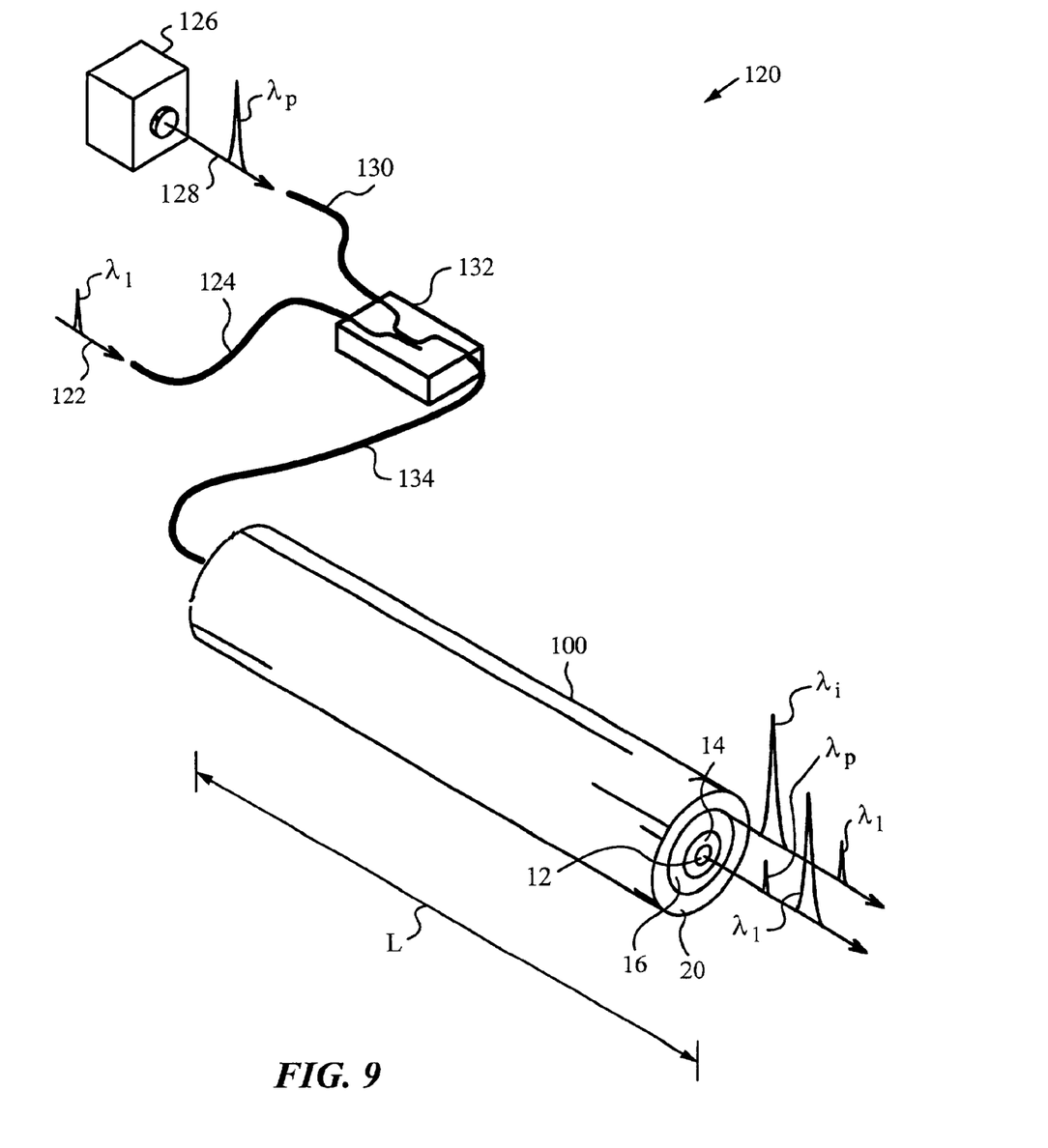
FIG. 9 is an isometric view of a fiber amplifier in accordance with the invention employed in a system.

The phasematching principle is used in accordance with the invention by introducing a non-phase-matched length section L of fiber amplifier 100 in which $n_3 < n_2$ to suppress cladding mode loss as better illustrated in FIG. 9. In FIG. 9 fiber amplifier 100 is used in a system 120 to amplify a signal 122 at wavelength $\lambda_1$ propagating through a fiber 124. System 120 has a pump source 126 providing a pump radiation 128 at wavelength $\lambda_p$. Pump radiation 128 is coupled from source 126 into a fiber 130.

A fiber coupler 132 receives fibers 124 and 130 and couples them into a single output fiber 134. Output fiber 134 is connected to fiber amplifier 100.

During operation, signal 122 and pump radiation 128 are combined in coupler 132 and launched together through output fiber 134. Fiber 134 delivers signal 122 and radiation 128 to active core 12 of fiber amplifier 100. In accordance with the above-described principles, signal 122 is amplified in core 12. Meanwhile, pump radiation 128 is depleted in passing through core 12, as indicated. In fact, at the end of non-phase matched section L there may be little pump radiation remaining in fiber amplifier 100.

ASE radiation 136 at a wavelength $\lambda_i$ is generated as a by-product of pumping active core 12. Wavelength $\lambda_i$ is longer than cutoff wavelength $\lambda_c$ of fiber amplifier 100 and is therefore lost into outer cladding 20. At the same time, some of signal 122, which travels in core mode 24, is also lost into outer cladding 20 because of cladding mode losses. However, since non phase-matched length section L has an index $n_3$ lower than $n_2$, the amount of loss of signal 122 to outer cladding 20 is minimized.

System 120 using non-phase-matched length section L of fiber amplifier 100 is thus capable of suppressing mode loss at wavelengths shorter than the cutoff wavelength. In fact, fiber amplifier 100 can be effectively employed in various optical systems.

In another alternative embodiment, the use of a non-phase-matched length section and the use of an absorbing or scattering materials can be combined in one fiber amplifier. For example, the scattering or absorbing material may constitute a part of the outer cladding or the entire outer cladding in such alternative embodiments.

Figure 10A:
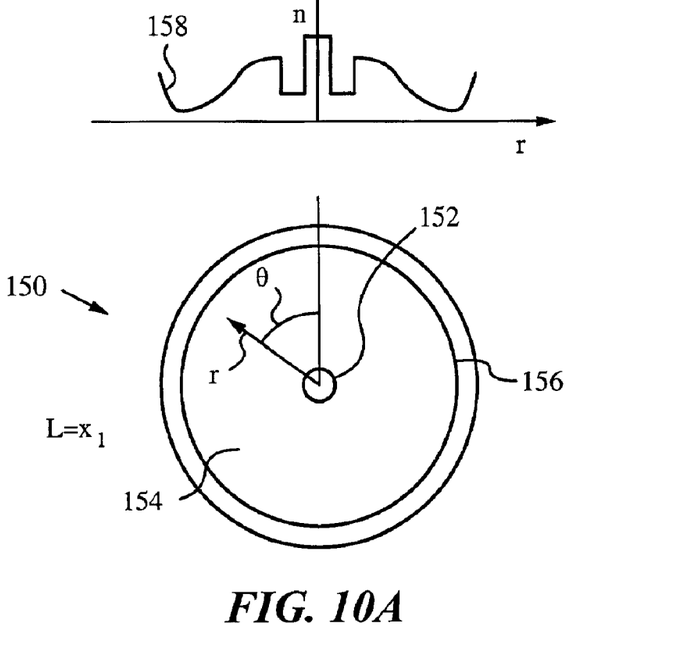
FIGS. 10A&B are cross-sectional view of alternative fiber amplifiers in accordance with the invention.
Figure 10B:
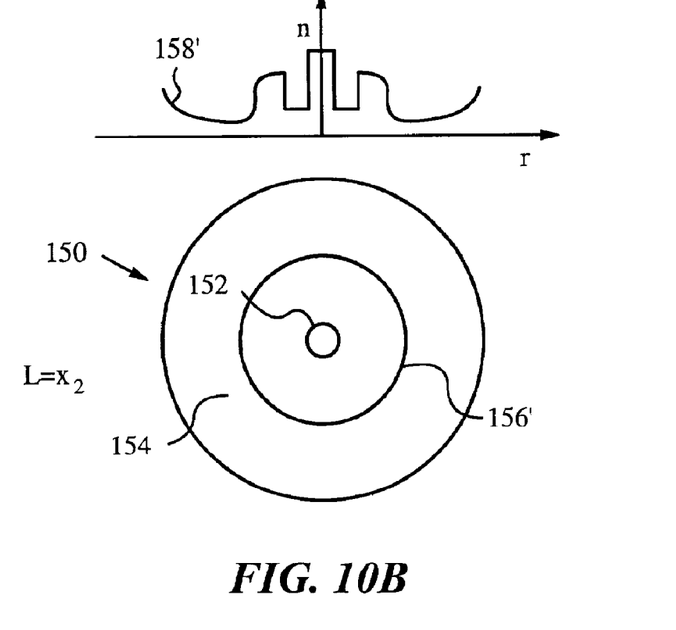

Yet another embodiment in accordance with the invention employs a non-phase-matched length section L which prevents phase matching between core and cladding modes by varying the cross-sectional profile of a fiber amplifier 150 as shown in FIGS. 10A and B. FIG. 10A shows the cross-section of fiber amplifier 150 at a position $L = x_1$. Fiber amplifier 150 has an active core 152 surrounded by a cladding 154 having a varying cladding index $n_{clad}$. A minimum value of $n_{clad}$ is indicated by line 156. A graph of index profile 158 showing the variation of n as a function of radius r is shown above fiber amplifier 150. A person skilled in the art will appreciate that, in general, $n_{clad}$ can vary as a function of radius r and azimuthal angle θ, i.e., $n_{clad} = n_{clad}(r, \theta)$.

At position $L = x_2$ the cross section of fiber amplifier 150 is different, as shown in FIG. 10B. In particular, index profile 158' remains the same as index profile 158 in and near active core 152 to ensure the same cutoff wavelength $\lambda_c$ and loss curve for longer wavelengths are the same at positions $x_1$ and $x_2$. However, the portion of index profile 158' further away from core 152 within cladding 154 exhibits a different curvature and minimum value than index profile 158. Specifically, the location of the new minimum value of $n_{clad}$ in index profile 158' is indicated by line 156'. Because of this variation of index profile from 158 at $x_1$ to 158' at $x_2$, the wavelength for which cladding mode loss is phasematched at position $x_1$ is different from the wavelength for which cladding mode loss is phasematched at position $x_2$. Therefore, phase matching between core mode and cladding modes in fiber amplifier 150 is prevented.

It will be clear to one skilled in the art that the above embodiments may be altered in many ways without departing from the scope of the invention. Accordingly, the scope of the invention should be determined by the following claims and their legal equivalents.

What is claimed is:

1. A fiber amplifier with suppressed cladding mode loss, said fiber amplifier comprising:
   a) an active core providing gain within a gain wavelength band;
   b) a cladding surrounding said active core, wherein said active core and cladding provide a net loss in a long wavelength range of said gain wavelength band and provide a net gain in a short wavelength range of said gain wavelength band;
   c) a means for suppressing coupling of radiation having a wavelength in said short wavelength range between said active core and said cladding.

2. The fiber amplifier of claim 1, wherein said means for suppressing coupling comprises a material distributed in said cladding, said material being selected from the group consisting of scattering materials and absorbing materials.

3. The fiber amplifier of claim 2, wherein said cladding comprises a depressed cladding having a depressed cladding cross-section and a refractive index $n_1$, and a secondary cladding having a secondary cladding cross-section and a refractive index $n_2$, and said material is distributed in said secondary cladding.

4. The fiber amplifier of claim 2, wherein said radiation has a mode diameter extending from said active core into said cladding, and said material is distributed outside said mode diameter.

5. The fiber amplifier of claim 2, wherein said absorbing material comprises a rare earth element.

6. The fiber amplifier of claim 1, wherein said means for suppressing coupling comprises a non-phase-matched length section of said fiber amplifier, such that the coupling of said radiation is not phase matched between said core and said cladding.

7. The fiber amplifier of claim 6, wherein said core has a core cross-section and a refractive index $n_0$, said cladding has a cladding cross-section and a refractive index $n_c$, and said non-phase-matched length section is formed by a predetermined selection of said core cross-section, cladding cross-section and refractive indices $n_0$, $n_{clad}$.

8. The fiber amplifier of claim 6, wherein said cladding comprises a depressed cladding having a depressed cladding cross-section and a refractive index $n_1$, and a secondary cladding having a secondary cladding cross-section and a refractive index $n_2$.

9. The fiber amplifier of claim 8, wherein said core has a core cross-section and a refractive index $n_0$, and said non-phase-matched length section is formed by a predetermined selection of said core cross-section, said depressed cladding cross-section, said secondary cladding cross section and refractive indices $n_0$, $n_1$, $n_2$.

10. The fiber amplifier of claim 9, wherein said cladding further comprises an outer cladding having an outer cladding cross-section and a refractive index $n_3$, where $n_3 < n_2$.

11. The fiber amplifier of claim 1, wherein said active core comprises Erbium.

12. The fiber amplifier of claim 11, wherein a wavelength between said short wavelength range and said long wavelength range is set near 1525 nm.

13. The fiber amplifier of claim 11, further comprising a pump source for pumping said core with radiation at a pump wavelength near 980 nm.

14. A method for suppressing a cladding mode loss in a fiber amplifier, said method comprising:
   a) providing an active core providing gain within a gain wavelength band;
   b) providing a cladding surrounding said active core, wherein said active core and cladding provide a net loss in a long wavelength range of said gain wavelength band and provide a net gain in a short wavelength range of said gain wavelength band;
   c) suppressing coupling of a radiation having a wavelength in said short wavelength range between said active core and said cladding.

15. The method of claim 14, wherein said suppressing coupling comprises distributing a material in said cladding for scattering or absorbing said radiation.

16. The method of claim 15, wherein said radiation has a mode diameter extending from said active core into said cladding, and said material is distributed outside said mode diameter.

17. The method of claim 14, wherein said suppressing coupling comprises preventing phase matching, such that the coupling of said radiation is not phase matched between said core and said cladding.

18. The method of claim 17, wherein phase matching is prevented by selecting a core cross-section and refractive index $n_0$ for said core, and by selecting a cladding cross section and refractive index $n_{clad}$ for said cladding.

19. The method of claim 17: wherein said core has a core cross section and a refractive index $n_0$; wherein said cladding comprises a depressed cladding having a depressed cladding cross-section and a refractive index $n_1$, and a secondary cladding having a secondary cladding cross-section and a refractive index $n_2$; and wherein said phase matching is prevented by selecting said core cross-section, said depressed cladding cross-section, said secondary cladding cross section and said refractive indices $n_0$, $n_1$, $n_2$.

20. The method of claim 19, wherein said cladding further comprises an outer cladding having an outer cladding cross section and a refractive index $n_3$, where $n_3 < n_2$.

21. The fiber amplifier of claim 1, wherein said active core and cladding provide a loss greater than 10 dB/m at a wavelength within said long wavelength range.

* * * * *